United States Patent [19]
Nakajima

[11] Patent Number: 5,903,974
[45] Date of Patent: May 18, 1999

[54] METHOD OF AND APPARATUS FOR PRODUCING HOLLOW RING GROOVE INSERT FOR ENGINE PISTON

[75] Inventor: Kenji Nakajima, Tokyo, Japan

[73] Assignee: Hino Motors, Ltd., Tokyo, Japan

[21] Appl. No.: 08/849,047

[22] PCT Filed: Jun. 11, 1996

[86] PCT No.: PCT/JP96/01577

§ 371 Date: Apr. 7, 1997

§ 102(e) Date: Apr. 7, 1997

[87] PCT Pub. No.: WO97/07330

PCT Pub. Date: Feb. 27, 1997

[30] Foreign Application Priority Data

Aug. 14, 1995 [JP] Japan .................................. 7-228558

[51] Int. Cl.[6] .............................. B23P 15/08; B23P 15/10
[52] U.S. Cl. ............................... 29/888.049; 29/888.073; 29/566; 29/33 R; 72/71
[58] Field of Search ...................... 29/888.049, 888.07, 29/888.073, 566, 33 R; 72/71

[56] References Cited

U.S. PATENT DOCUMENTS

| | | | |
|---|---|---|---|
| 3,805,532 | 4/1974 | De Montremy | 29/156.6 |
| 4,085,490 | 4/1978 | McCormick et al. | 29/156 |
| 4,485,656 | 12/1984 | Nilson et al. | 290/156 R |
| 4,494,294 | 1/1985 | Sims | 29/156.4 |
| 5,301,599 | 4/1994 | Dearnley et al. | 29/888.049 |
| 5,396,787 | 3/1995 | Kanemitsu et al. | 29/888.049 |

*Primary Examiner*—Erick R. Solis
*Attorney, Agent, or Firm*—McCormick, Paulding & Huber

[57] ABSTRACT

A method of and apparatus for producing a hollow ring groove insert for an engine piston, which is inserted by casting near the top of a piston for an engine to constitute a ring groove and a cooling path adjacent to the ring groove. The hollow ring groove insert comprises a formed sheet ring and a ring body having an inner peripheral surface and a piston ring groove. A process for producing the formed sheet ring includes the steps of fitting a sheet ring on a forming die such that the sheet ring covers a forming groove; pressing a forming roll against the sheet ring while rotating the forming die with a floating ring being placed in a movable state where it is radially movable by disengagement from a tapered portion of a centering member, thereby forming circular collars on the sheet ring; pressing a cutting tool against the outer peripheral portions of the circular collars with the floating ring being placed in a state where it is centered and fixed in coincidence with the axial center of the forming die by engagement with the tapered portion of the centering member, thereby turning the outer peripheral portions of the circular collars; and pressing a deburring tool against the outer peripheral portions of the circular collars with the floating ring being placed in the same fixed state, thereby removing burrs from the circular collars.

6 Claims, 9 Drawing Sheets

5,903,974

METHOD OF AND APPARATUS FOR PRODUCING HOLLOW RING GROOVE INSERT FOR ENGINE PISTON

TECHNICAL FIELD TO WHICH THE INVENTION BELONGS

The present invention relates to a method of and apparatus for producing a hollow ring groove insert for an engine piston. More particularly, the present invention relates to a method of and apparatus for efficiently and highly accurately producing a hollow ring groove insert which is integrally inserted in a piston for a small-sized diesel engine by casting to form a top-ring groove and an annular cooling path for cooling the groove.

CONVENTIONAL TECHNIQUE

A cylinder and a piston which constitute a combustion chamber of a diesel engine are, mechanical parts which are required to exhibit long-term durability under severe conditions where they are subjected to high loads due to combustion impact pressure, heat and so forth. To meet the requirement, a piston has recently been developed in which a ring-shaped cooling path is provided near a top-ring groove of the piston, and a coolant (engine oil) is circulated through the ring-shaped cooling path to cool the piston.

It is necessary in order to cool the piston efficiently to provide the ring-shaped cooling path as close to the ring groove as possible. As shown in FIGS. 15 and 16, it has been proposed to insert a hollow ring groove insert 85 in the outer periphery of the top portion of a piston 80 made of aluminum alloy by casting process (for example, JP-A-5-231539 (Japanese Patent Application Unexamined Publication, KOKAI).

In FIGS. 15 and 16, the hollow ring groove insert 85 has a structure comprising a formed sheet ring 10 with a U-shaped cross-section, and a cast ring (a ring body) 82, which are integrated by welding together the outer peripheral portion of the ring 10 and the inner peripheral surface 83 of the ring 82. The formed sheet ring 10 is produced by roll-forming a sheet of a metal having the same coefficient of thermal expansion as that of an aluminum alloy used to form the piston body. The cast ring 82 is produced from a material having high wear resistance and the same coefficient of thermal expansion as that of the piston body, for example, a Niresist material. A cooling path 86 is defined by the formed sheet ring 10 and the inner peripheral surface 83 of the cast ring. The cast ring 82 has a piston ring groove 81 for accommodating a top ring.

The formed sheet ring 10, which is a metal sheet with a U-shaped cross-section, has heretofore been produced as follows: A stainless steel sheet having a width of 18 mm, a length of 290 mm and a thickness of 0.6 mm, by way of example, is formed into an arcuate shape by a roll forming machine. Then, the metal sheet formed in an arcuate shape is fitted on a jig with a circular cross-section of a welding apparatus and butt-welded at both ends thereof to form a ring (sheet ring), and the ring is roll-formed into a piece with a U-shaped cross-section.

The cast ring is produced from a cast Niresist material such that the inner diameter thereof is slightly smaller than the outer diameter of the sheet ring having a U-shaped cross-section. The cast ring is heated so that its inner diameter expands, and in this state, the formed sheet ring is warm-fitted into the cast ring. Thereafter, the joint surfaces of the formed sheet ring and cast ring are welded to each other by a welding apparatus.

The above-described formed sheet ring with a U-shaped cross-section has heretofore been produced by carrying out the following steps: A sheet ring formed by welding the butted ends of a sheet is roll-formed by a roll forming apparatus to form a circular collar on each end thereof, as described, for example, in JP-A-6-210383 (Japanese Patent Application Unexamined Publication, KOKAI), and JP-A-6-269882. Then, the formed sheet ring is removed from the roll forming apparatus and set on a turning apparatus to turn the outer peripheral portion of each circular collar, thereby finishing the outer diameter to a predetermined dimension conforming to the inner diameter of the cast ring. Further, the formed sheet ring is set on a deburring apparatus to remove burrs from the end portions of the circular collars, which were formed during the turning process.

With the conventional technique, generally, the formed sheet ring is moved and set, for each working step, on an independent special-purpose working apparatus. Therefore, the production needs a large number of manhours. Moreover, every time the formed sheet ring is set, the set position thereof may subtly differ. This is an obstacle in producing the formed sheet ring with high accuracy.

In addition, the conventional technique requires three special-purpose apparatuses, i.e. a roll forming apparatus, a turning apparatus, and a deburring apparatus. These series of processing apparatuses are not integrated but disposed here and there. As a result, the overall size of the system becomes large. Moreover, a great deal of installation cost is needed because a large number of independent apparatuses are required. Thus, the conventional technique has the disadvantage that the hollow ring groove insert cannot efficiently be produced.

JP-A-6-269882 (Japanese Patent Application Unexamined Publication, KOKAI) proposes a technique whereby roll forming and turning are carried out without moving the workpiece to different working machines. With the proposed technique, however, an operation of centering and fixing a floating ring cannot smoothly be performed. Therefore, efficient working cannot be realized.

PROBLEMS THAT THE INVENTION IS TO SOLVE

An object of the present invention is to provide a method of and apparatus for producing a hollow ring groove insert for an engine piston, which solve the disadvantages of the conventional technique, and particularly, to incorporate a roll forming mechanism, a turning mechanism, and a deburring mechanism into a single working apparatus so that it is unnecessary to remove a workpiece from a working apparatus and to set it on a subsequent working apparatus for each step in the production of a formed sheet ring constituting a hollow ring groove insert, thereby enabling formed sheet rings to be produced continuously and efficiently.

Another object of the present invention is to incorporate a roll forming mechanism, a turning mechanism, and a deburring mechanism into a single working apparatus to realize a compact structure so that the apparatus can be installed in a narrow space, thereby effectively utilizing the space in a factory, and reducing the installation cost.

A further object of the present invention is to enable a formed sheet ring to be worked with high accuracy by deforming with a forming roll a sheet ring disposed on the outer periphery of a floating ring which is loosely fit in a forming groove such that the floating ring is free to move in a radial direction.

A still further object of the present invention is to enable a floating ring and a formed sheet ring to be highly accurately centered in coincidence with the axial center of a forming die simply by providing a tapered portion at one end of a centering member, and performing a relatively simple operation in which the centering member is axially moved so that the tapered portion is engaged with the bore of the floating ring, and also to enable circular collars of the formed sheet ring to be turned with high accuracy and to allow deburring to be carried out continuously and easily by virtue of the fact that the floating ring and the formed sheet ring are highly accurately centered in coincidence with the axial center of the forming die. Other objects and advantages of the present invention will become apparent in the following description.

MEANS OF SOLVING THE PROBLEMS

A hollow ring groove insert for an engine piston produced by the method of and apparatus for producing an engine hollow ring groove insert according to the present invention includes a formed sheet ring having a cylindrical part and a circular collar extending outward from each end of the cylindrical part, and a ring body having an inner peripheral surface and a piston ring groove, wherein the outer peripheral portion of each circular collar of the formed sheet ring is joined to the inner peripheral surface of the ring body. The hollow ring groove insert is disposed near the top of a piston for an engine to constitute a ring groove and a cooling path adjacent to the ring groove.

The production method according to the present invention includes the steps of producing a formed sheet ring having a cylindrical part and a circular collar extending outward from each end of the cylindrical part; producing a ring body having an inner peripheral surface and a piston ring groove; combining together the formed sheet ring and the ring body such that the outer peripheral portion of each circular collar of the formed sheet ring engages with the inner peripheral surface of the ring body; and joining together the outer peripheral portion of the circular collar and the inner peripheral surface of the ring body.

The step of producing the formed sheet ring includes the steps of producing a sheet ring, and preparing a production apparatus for producing a formed sheet ring. The production apparatus for producing a formed sheet ring has a forming die with a circumferential forming groove, a floating ring, a forming roll, a cutting tool, and a deburring tool.

The step of producing a formed sheet ring further includes the steps of fitting a sheet ring on the forming die such that the sheet ring covers the forming groove; pressing the forming roll against the sheet ring radially inward while rotating the forming die with the floating ring placed in a movable state where it is radially movable, thereby forming circular collars on the sheet ring; pressing the cutting tool against the outer peripheral portions of the circular collars while rotating the forming die with the floating ring placed in a state where it is centered and fixed in coincidence with the axial center of the forming die, thereby turning the outer peripheral portions of the circular collars; and pressing the deburring tool against the outer peripheral portions of the circular collars while rotating the forming die with the floating ring placed in the state where it is centered and fixed in coincidence with the axial center of the forming die, thereby removing burrs from the circular collars.

In the process for producing a formed sheet ring according to the present invention, the three steps, that is, the step of forming circular collars on the sheet ring, the step of turning the outer peripheral portions of the circular collars, and the step of removing burrs, are carried out as a continuous process. While these three steps are carried out, the formed sheet ring is not removed from the production apparatus. The step of removing burrs comprises the step of inserting the outer peripheral portions of the circular collars into circumferential groove-shaped cutting edges, respectively, of a deburring roll.

The apparatus for producing a formed sheet ring as a constituent element of a hollow ring groove insert for an engine piston according to the present invention has a forming die with a circumferential forming groove; a centering member having a tapered portion formed at one end thereof, the centering member being axially slidable; a floating ring; a sheet ring retainer for positioning a sheet ring on the forming die such that the sheet ring covers the forming groove, and for clamping the sheet ring in cooperation with a work holder disposed on the outer peripheral portion of the forming die; a forming roll having a predetermined width smaller than the width of the forming groove, the forming roll being arranged to press the sheet ring radially inward into the forming groove, thereby forming circular collars on the sheet ring; a cutting tool for cutting the outer peripheral portions of the circular collars of the formed sheet ring being rotated; and a deburring tool brought into contact with the circular collars of the formed sheet ring being rotated to remove burrs formed by the cutting process.

The floating ring has an outer diameter equal to the inner diameter of the formed sheet ring and is disposed in the forming groove. One edge of the inner peripheral surface of the floating ring is slightly chamfered and selectively engaged with or disengaged from the tapered portion of the centering member. When the edge thereof is engaged with the tapered portion, the floating ring assumes a fixed position in which it is centered in coincidence with the axial center of the forming die, whereas, when the edge is disengaged from the tapered portion, the floating ring assumes a movable position in which it is radially movable within the forming groove. When circular collars are to be formed on the sheet ring by the forming roll, the floating ring is placed in a movable state where it is radially movable within the forming groove. While the cutting tool is cutting the outer peripheral portions of the circular collars of the formed sheet ring and while the deburring tool is removing the burrs, the floating ring is fixed in the centered state.

The width of the forming roll is smaller than the width of the forming groove, and the difference therebetween is approximately double the sheet thickness of the formed sheet ring. The deburring tool has circumferential groove-shaped cutting edges with a width approximately equal to the sheet thickness of the formed sheet ring, so that the outer peripheral portions of the circular collars are inserted into the groove-shaped cutting edges, respectively, of the deburring tool, and thus the burrs are removed from the circular collars. The forming die has a cylindrical body coaxial with the centering member, a collared shaft with a collar, and a work holder slidably fitted on the outer peripheral surface of the body. The forming groove is formed between the body and the collar.

The sheet ring retainer has a shaft slidably fitted to a support, a ring retaining member secured to the shaft to axially face the forming die and having a plurality of radial projections on the outer peripheral surface thereof, and a ring holder slidably fitted on the outer peripheral surface of the support and having relief grooves formed so as to correspond to the projections, respectively. The plurality of radial projections have an outer diameter equal to the inner diameter of the sheet ring.

In the production apparatus according to the present invention, in a state where the sheet ring retaining member and the ring holder are axially separate from the forming die, the sheet ring is fed from a feed mechanism and fitted onto the outer peripheral surface of the ring retaining member, and thereafter, the sheet ring retaining member and the forming die are axially moved and engaged with each other, thereby enabling the sheet ring to be positioned over the forming groove, being clamped between the ring holder and the work holder.

MODE FOR CARRYING OUT THE INVENTION

Figure 1:
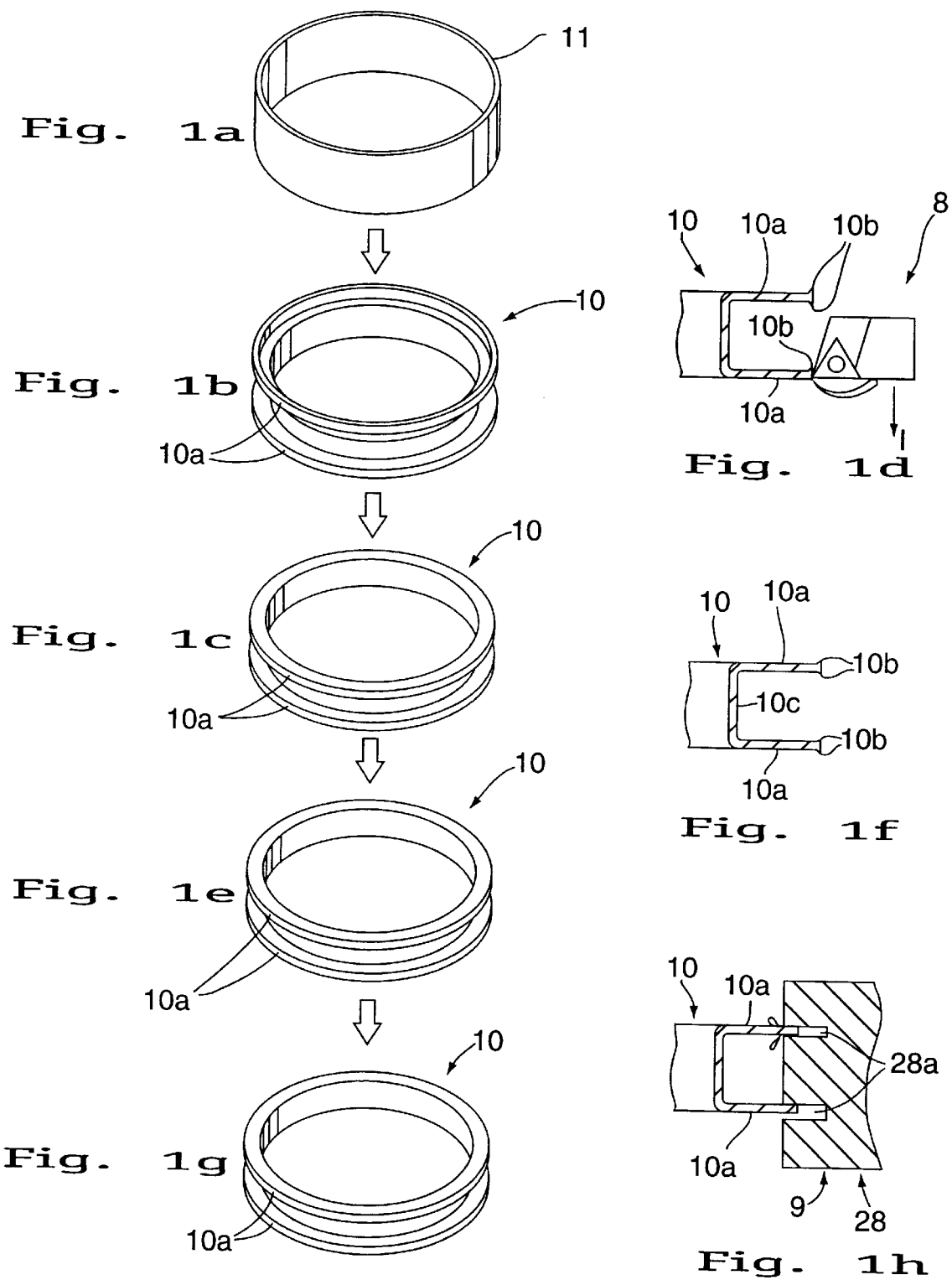
FIG. 1 illustrates perspective views and fragmentary vertical sectional views, which show the sequence for producing a formed sheet ring.

The present invention will be described below by way of embodiments shown in the drawings. In FIGS. 2 to 5, a formed sheet ring producing apparatus 1 according to the present invention has a forming die 2, a centering member 3, a floating ring 4, a forming roll 5, a sheet ring retainer 6, a cutting device 8, and a deburring device 9.

First, the working sequence for producing a formed sheet ring 10 will be briefly described with reference to FIG. 1. A stainless steel sheet having a width of 18 mm, a length of 290 mm and a thickness of 0.6 mm, by way of example, is formed into an arcuate shape, and the stainless steel sheet formed in an arcuate shape is then butt-welded at both ends thereof to form a sheet ring 11 (FIG. 1(*a*)), which is then set on a roll forming apparatus (not shown) to form circular collars 10*a* on both ends thereof, thereby producing a formed sheet ring 10 (FIG. 1(*b*)).

Next, the outer peripheral portion of each circular collar 10*a* thus formed is turned by the cutting device 8 to finish the outer diameter of the circular collar 10*a* to a predetermined dimension (FIGS. 1(*c*) and 1(*d*)). During the turning process, burrs 10*b* are formed on the end portions of the circular collars 10*a* (FIGS. 1(*e*) and 1(*f*)).

The circular collars 10*a* of the formed sheet ring 10 finished with a predetermined outer diameter by the turning process are inserted into groove-shaped cutting edges 28*a* of the deburring device 9 to remove the burrs 10*b*, thereby completing a formed sheet ring 10. The groove-shaped cutting edges 28*a* of the deburring device 9 may be those which have an edge portion as stated in JP-A-7-237021 (Japanese Patent Application Unexamined Publication, KOKAI), or those which are stated in JP-A-8-71846.

The forming die 2 is used to form circular collars 10*a* on both ends of the sheet ring 11 by roll forming. In FIGS. 2 to 5, the forming die 2 has a metallic cylindrical body 12 hardened to prevent wear due to roll forming process. The body 12 has a fitting hole 12*a* formed in the center thereof and also has a centering member accommodating chamber 12*b* at one end thereof. The chamber 12*b* is larger in diameter than the fitting hole 12*a*.

The fitting hole 12*a* is fitted with a collared shaft 13 formed with a collar 13*a* having the same diameter as the outer diameter of the body 12. The collared shaft 13 further has a shaft portion 13*b* formed with a radial square hole 13*c*. The collar 13*a* and the body 12 are integrally fixed as one unit so as to be spaced apart from each other by a distance equal to the width of a formed sheet ring 10 to be worked. The body 12 and the collar 13*a* form a forming groove 14.

A recess 13*e* is formed in an outer end surface 13*d* of the collar 13*a* of the collared shaft 13. The arrangement is such that the recess 13*e* is engaged with a projection 21*b* of the sheet ring retainer 6, described later, to position the forming die 2 and the sheet ring retainer 6 relative to each other.

The floating ring 4 retains the sheet ring 11 during roll forming of the sheet ring 11 in order to form the formed sheet ring 10 to the desired inner diameter with high accuracy. The floating ring 4 is a ring-shaped member having the same width as that of the formed sheet ring 10. The outer diameter of the floating ring 4 is the same as the outer diameter of the body 12. The floating ring 4 has a bore 4*a* formed in the center thereof. The diameter of the bore 4*a* is set smaller than the inner diameter of the centering member accommodating chamber 12*b*. The floating ring 4 is fitted in the forming groove 14. The floating ring 4 is arranged to be radially movable within the forming groove 14. An edge of the bore 4*a* of the floating ring is slightly chamfered to relax a stress produced when the bore 4*a* is engaged with the tapered portion 3*a* of the centering member 3.

The centering member 3 centers the floating ring 4 in coincidence with the axial center of the forming die 2. The centering member 3 has a tapered portion 3*a* formed at one end thereof and further has a hole 3*b* formed in the center thereof. The hole 3*b* is fitted with the shaft portion 13*b* of the collared shaft 13 so that the centering member 3 is axially slidable on the shaft portion 13*b*.

A retaining member 15 is secured by screws 16 to the other end of the centering member 3. The retaining member 15 is axially movable in the square hole 13c of the collared shaft 13. The retaining member 15 is connected by a pin 19 to a driving shaft 18 which is slidably fitted into the shaft portion 13b of the collared shaft 13. The arrangement is such that, by axially moving the driving shaft 18, the centering member 3 is brought close to the floating ring 4 and the tapered portion 3a is pressed into the bore 4a of the floating ring 4, thereby centering the floating ring 4 in coincidence with the axial center of the forming die 2. The axial movement of the driving shaft 18 also causes the centering member 3 to separate from the floating ring 4 so as to cancel the press-engagement between the tapered portion 3a and the bore 4a of the floating ring 4, thereby allowing the floating ring 4 to move freely in the radial direction within the forming groove 14.

The sheet ring retainer 6 feeds the sheet ring 11 over the forming groove 14 of the forming die 2 and also clamps the formed sheet ring 10 prior to turning of the circular collars 10a of the formed sheet ring 10. The sheet ring retainer 6 is disposed to face the forming die 2 in the axial direction. The sheet ring retainer 6 has a support 20 secured to a base (not shown), and a shaft 22 is slidably fitted in a fitting hole 20a formed in the support 20. The distal end of the shaft 22 is secured to a ring retaining member 21.

The ring retaining member 21 has six radially extending projections 21a formed on an end portion thereof. The outer diameter of the projections 21a is set equal to the inner diameter of the sheet ring 11 so that the ring retaining member 21 retains the sheet ring 11, which is supplied from an automatic feeder (not shown), by fitting it thereon.

A cylindrical ring holder 23 is slidably fitted on the outer periphery of the support 20. The inner diameter of the ring holder 23 is set equal to the outer diameter of the collar 13a of the collared shaft 13. The ring holder 23 has relief grooves 23a formed so as to face the six projections 21a of the ring retaining member 21. The arrangement is such that, when the ring retaining member 21 is withdrawn into the ring holder 23, the projections 21a are received in the relief grooves 23a, thereby enabling the ring retaining member 21 to move without causing an interference.

In addition, a work holder 24 is axially movably fitted on the outer periphery of the body 12 of the forming die 2 as in the case of the sheet ring retainer 6 to hold the sheet ring 11 by clamping it at both ends in cooperation with the ring holder 23.

Figure 2:
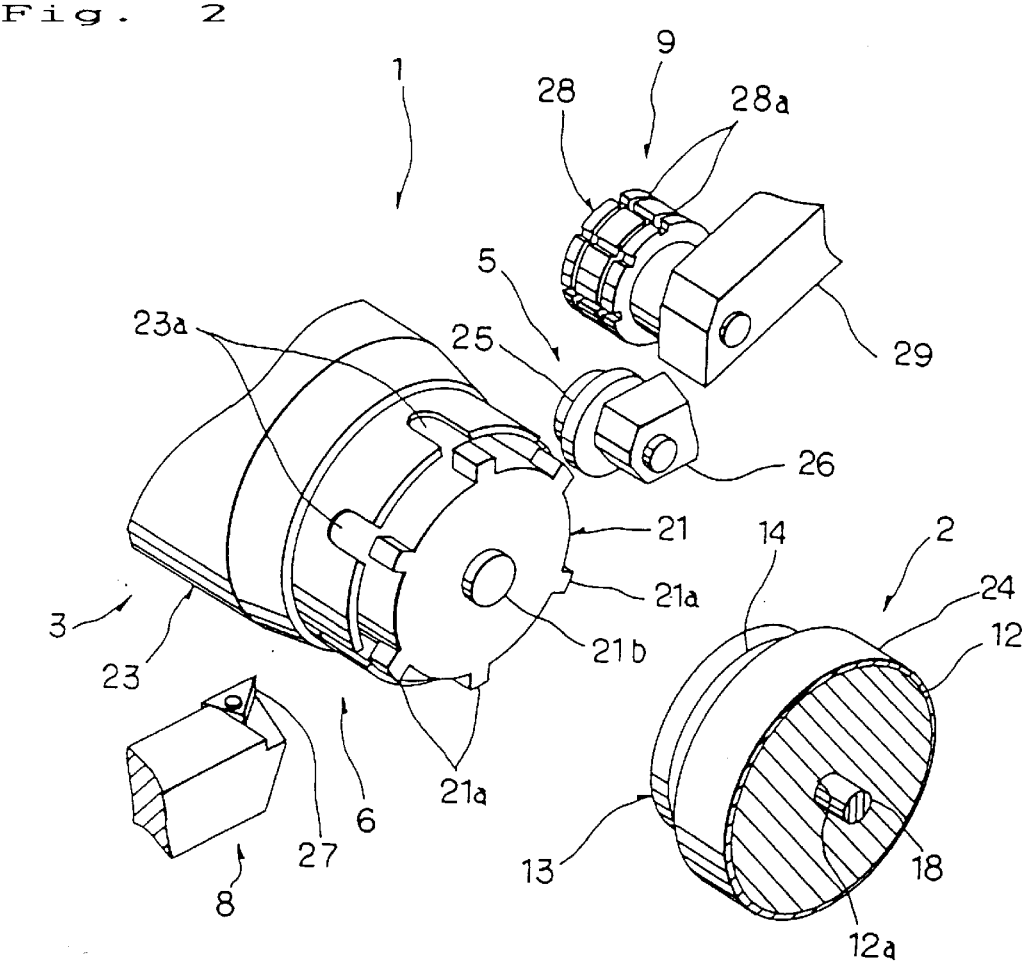
FIG. 2 is a perspective view showing essential parts of an apparatus for producing a formed sheet ring.
Figure 3:
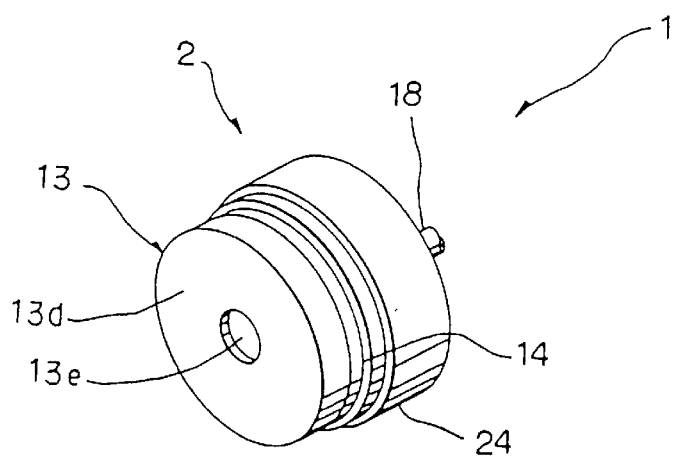
FIG. 3 is a perspective view of a forming die.
Figure 4:
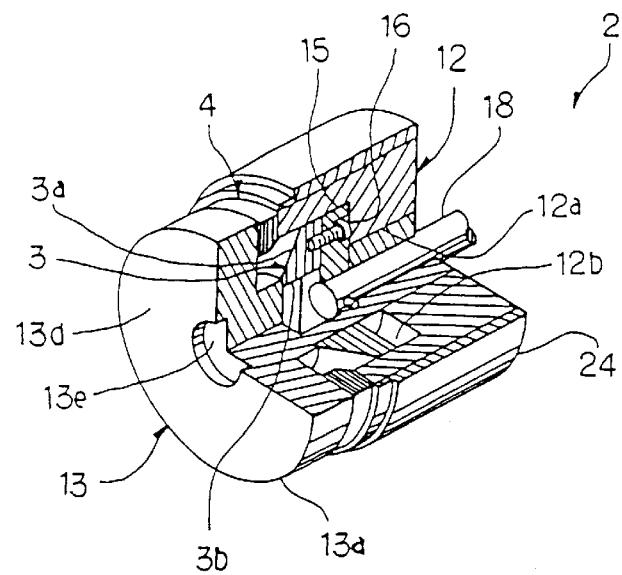
FIG. 4 is a partially cutaway perspective view showing the structure of the forming die.
Figure 5:
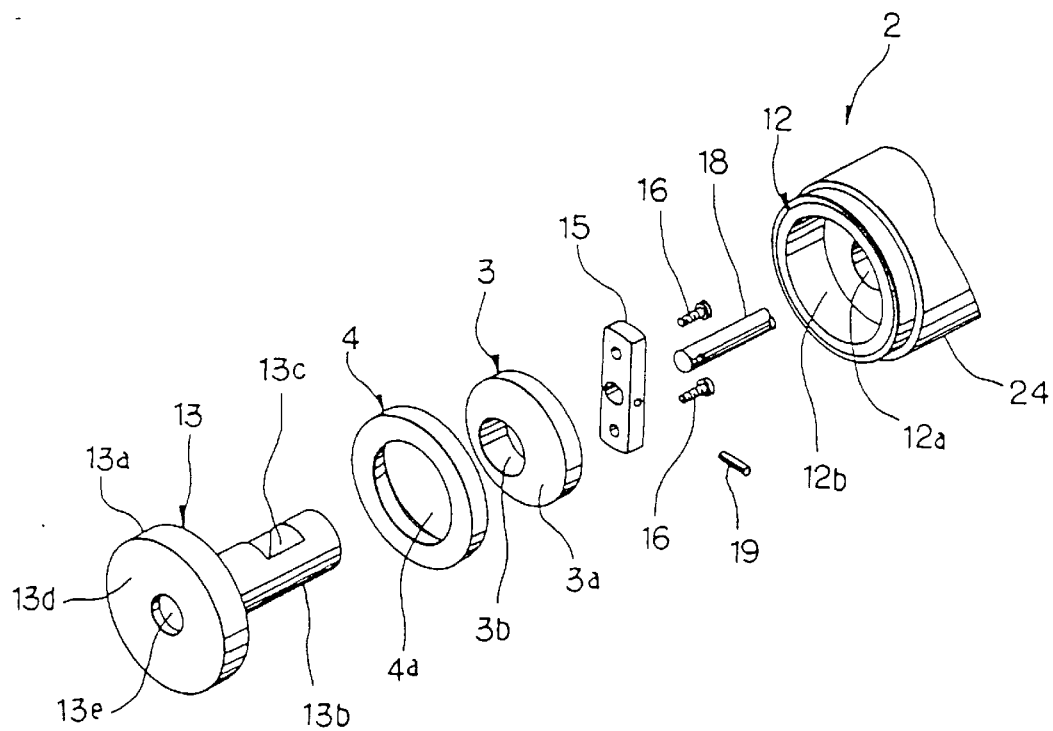
FIG. 5 is an exploded perspective view of the forming die.

The forming roll 5 is used to roll-form the sheet ring 11. In FIG. 2, the forming roll 5 is arranged to be movable toward or away from the forming die 2. A roll 25 is rotatably supported by a holder 26 so as to face the forming groove 14. During roll forming, while being rotated, the roll 25 is pressed into the forming groove 14, thereby roll-forming the sheet ring 11.

The cutting device 8 cuts the circular collars 10a of the roll-formed sheet ring 10 when the ring is rotated. In FIG. 2, a cutting tool 27 is disposed to face the forming die 2 such that the turning tool 27 is movable in the axial direction of the forming die 2. The turning tool 27 is brought into contact with the formed sheet ring 10 rotating while being held by the ring holder 23 and the work holder 24, thereby cutting the outer peripheral portions of the circular collars 10a.

The deburring device 9 removes the burrs 10b from the circular collars 10a, which were formed by the turning process. A deburring roll 28 is rotatably retained by a supporting holder 29 so as to be movable toward or away from the forming groove 14.

The deburring roll 28 has groove-shaped cutting edges 28a with a width equal to the sheet thickness of the formed sheet ring 10 to remove the burrs 10b from the end portions of the circular collars 10a by inserting the circular collars 10a into the groove-shaped cutting edges 28a, respectively.

A method of producing the formed sheet ring 10 having circular collars 10a at both ends thereof, shown in FIG. 1(g), from the sheet ring 11, shown in FIG. 1(a), includes a step at which the centering member 3 having a tapered portion 3a at one end thereof is separated from the bore 4a of the annular floating ring, thereby bringing the floating ring 4 into a movable state where it is radially movable; a step at which the sheet ring 11 is fitted over the circumferentially formed forming groove 14; and a step at which the roll 25 having a smaller width than the width of the forming groove 14 is pressed against the sheet ring 11 to push the latter into the forming groove 14, thereby forming circular collars 10a on both ends of the sheet ring 11. The method further includes a step at which the tapered portion 3a of the centering member 3 is pressed so as to engage with the bore 4a of the floating ring 4, thereby centering the formed sheet ring 10 in coincidence with the axial center of the forming die 2, together with the floating ring 4; a step at which the outer peripheral portions of the circular collars 10a are turned; and a step at which the groove-shaped cutting edges 28a of the deburring device 9, which is circumferentially formed with the cutting edges 28a having a width equal to the sheet thickness of the sheet ring 11, are brought into contact with the circular collars 10a to remove the burrs 10b from the end portions of the circular collars 10a, which were formed during the turning process.

Figure 6:
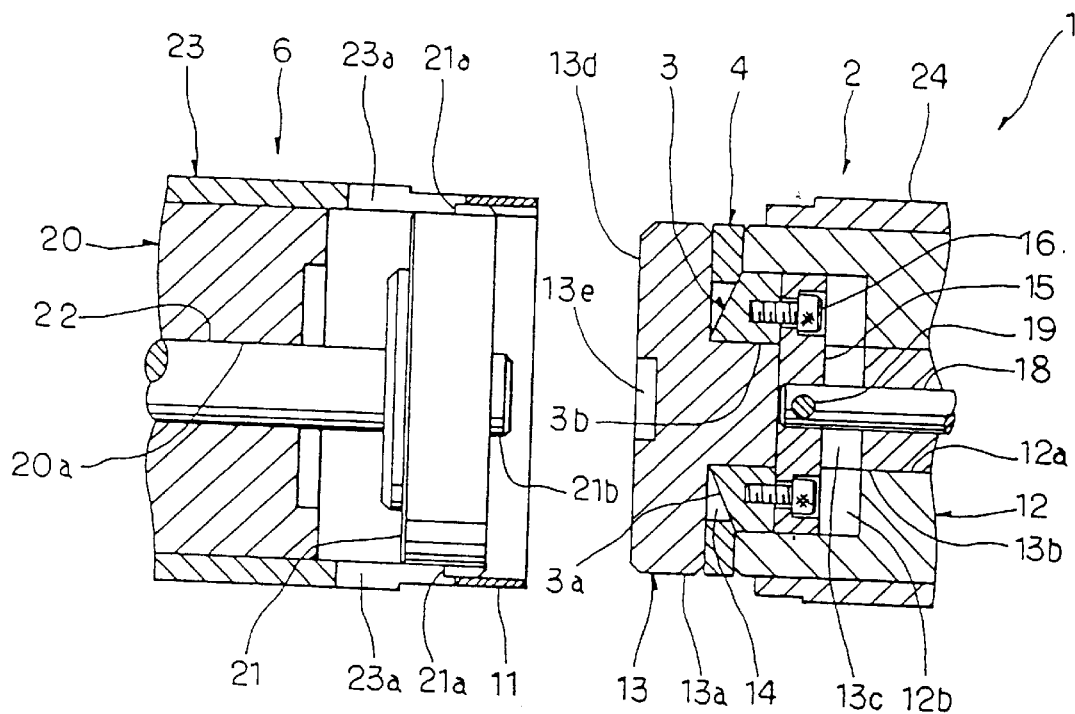
FIG. 6 is a vertical sectional view showing the forming die and a sheet ring retainer fitted with a sheet ring, which are separate from each other in a preparatory state.
Figure 7:
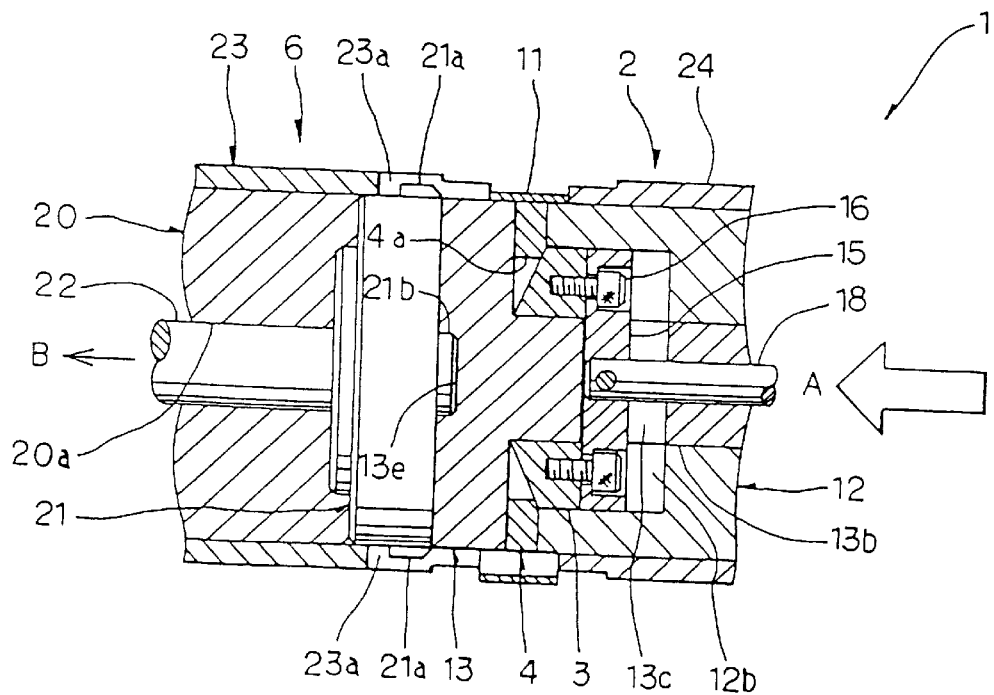
FIG. 7 is a vertical sectional view showing the forming die and the sheet ring retainer, which are combined together with the sheet ring set on the forming die.

In the method of producing the formed sheet ring 10, as shown in FIG. 6, a sheet ring 11 is supplied from the automatic feeder (not shown) and fitted onto the six projections 21a of the ring retaining member 21 of the sheet ring retainer 6, which is separated from the forming die 2. As shown in FIG. 7, the forming die 2 is moved in the direction of the arrow A, and thus the sheet ring 11 retained on the projections 21a is moved to fit onto the collar 13a of the collared shaft 13. Further, the forming die 2 is moved in the direction of the arrow A while pressing the ring retaining member 21 in the direction of the arrow B, thereby fitting the projection 21b of the ring retaining member 21 into the recess 13e, and thus positioning the forming die 2 and the sheet ring retainer 6 relative to each other.

The sheet ring 11 moved from the ring retaining member 21 to the collared shaft 13 is pressed by the ring holder 23 and held over the forming groove 14 by being clamped between the ring holder 23 and the work holder 24. At this time, the centering member 3 is pressed in the direction of the arrow A so that the tapered portion 3a is in press-engagement with the bore 4a of the floating ring 4. Therefore, the outer periphery of the floating ring 4 is in a centered state where it is coincident with the collar 13a of the collared shaft 13. Accordingly, the sheet ring 11 smoothly moves to a position over the forming groove 14 without getting caught anywhere.

Figure 8:
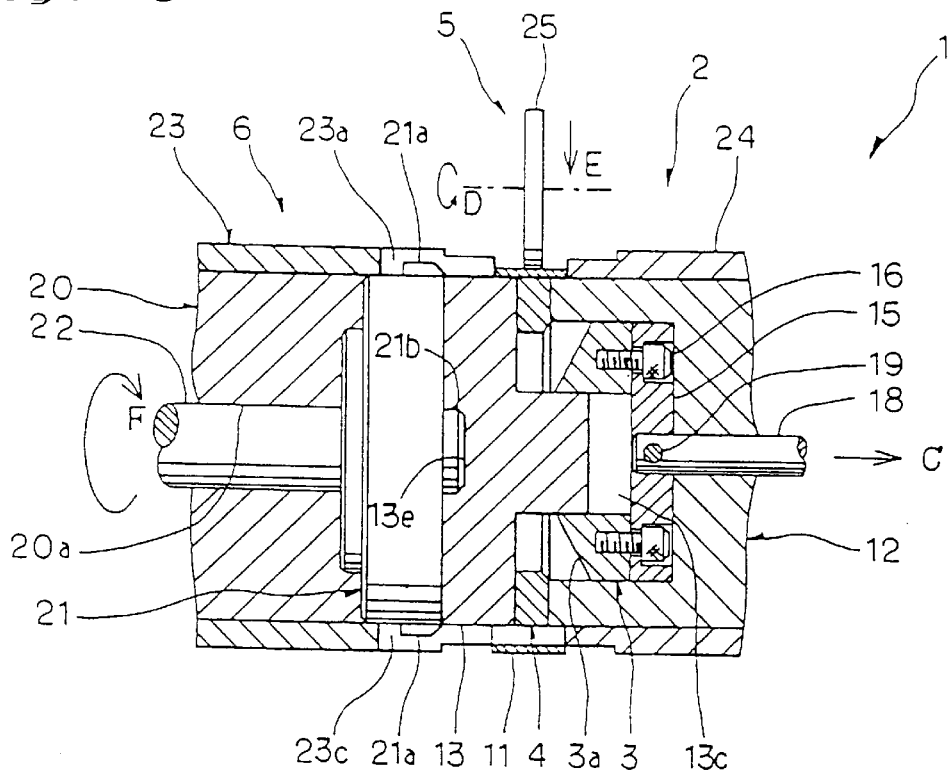
FIG. 8 is a vertical sectional view showing an initial state of forming the sheet ring by a forming roll.

Then, in FIG. 8, the driving shaft 18 is moved in the direction of the arrow C to disengage the centering member 3 from the floating ring 4, thereby canceling the press-engagement between the bore 4a and the tapered portion 3a, and thus allowing the floating ring 4 to move freely in the radial direction within the forming groove 14. Thereafter, the shaft 22 is rotated in the direction of the arrow F together with the sheet ring 11, while the roll 25 rotating in the direction of the arrow D is moved in the direction of the arrow E to come in contact with the sheet ring 11. Thereafter, the roll 25 is further moved in the direction of the arrow E to press the sheet ring 11 into the forming groove 14, thereby roll-forming the sheet ring 11 to form circular collars 10a on both ends thereof.

At this time, the inner peripheral portion of the formed sheet ring 10 is in contact with the floating ring 4, and in this regulated state, the formed sheet ring 10 is roll-formed while the floating ring 4 is moving in the radial direction. Therefore, the formed sheet ring 10 is formed in conformity to the outer diameter of the floating ring 4 and thus finished highly accurately without variations.

Figure 9:
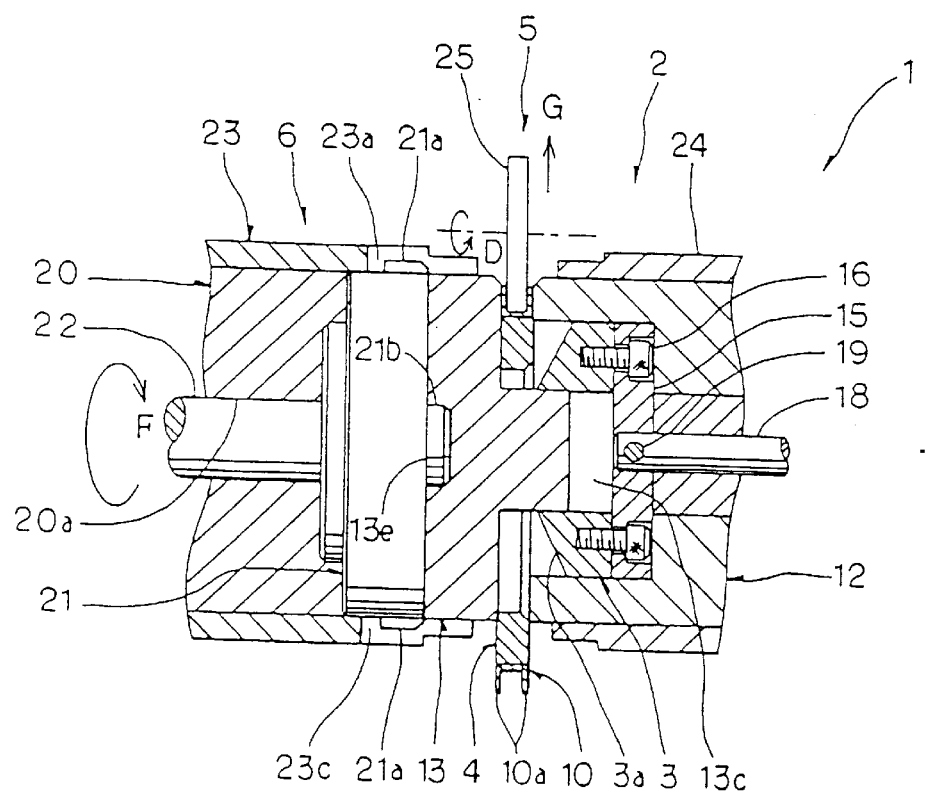
FIG. 9 is a vertical sectional view showing a state where a formed sheet ring has been formed by the forming roll.
Figure 10:
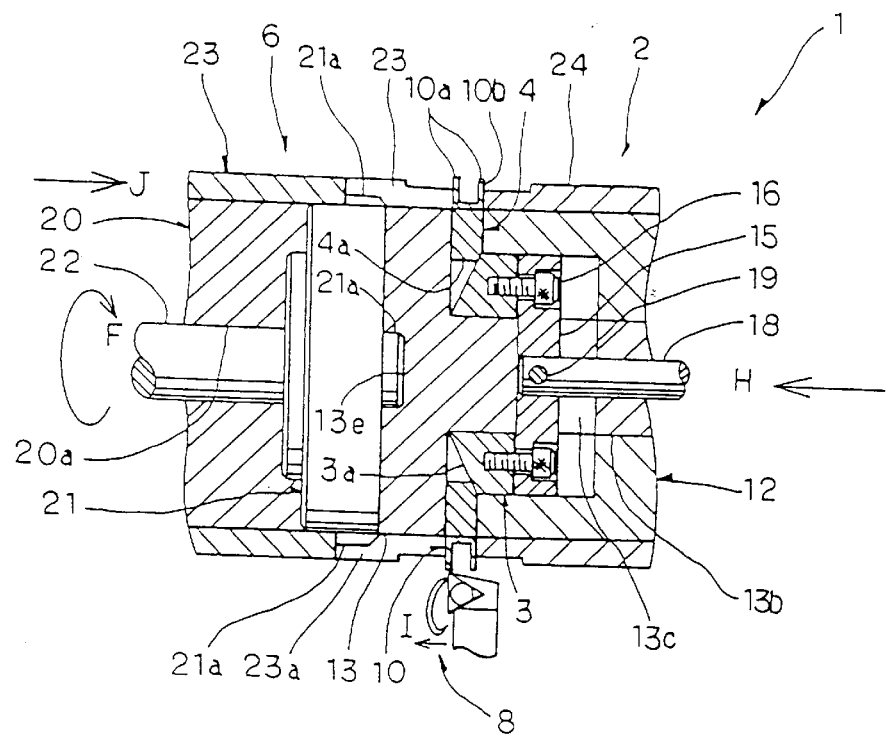
FIG. 10 is a vertical sectional view showing the way in which circular collars of the formed sheet ring are turned by a turning device.
Figure 11:
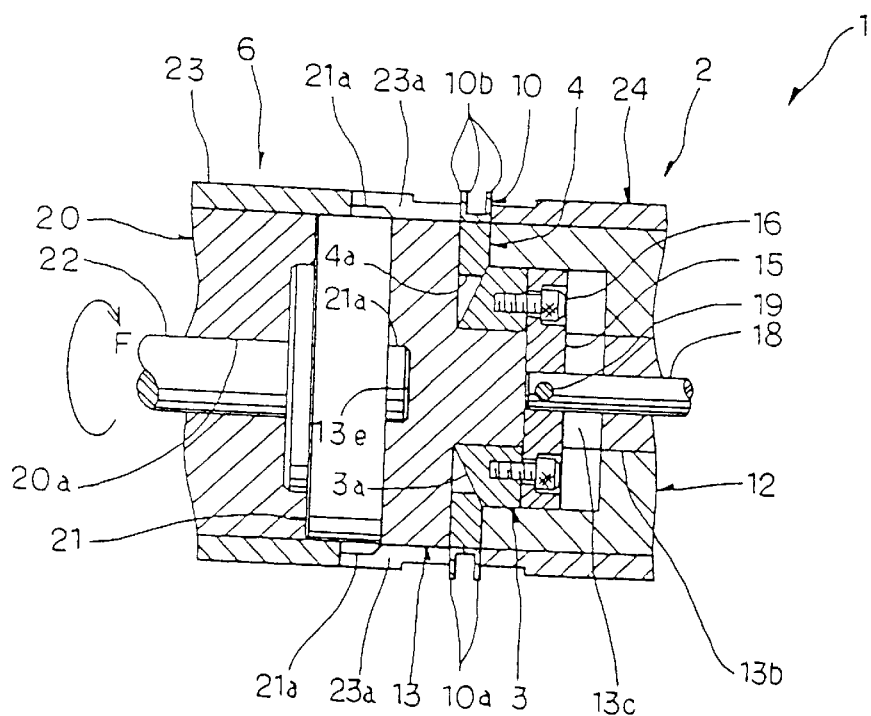
FIG. 11 is a vertical sectional view showing a state where the turning has been completed.

After the roll forming, in FIG. 9, the roll 25 is moved in the direction of the arrow G, thereby separating the roll 25 from the forming die 2. Next, in FIG. 10, the ring holder 23 is moved in the direction of the arrow J, while the work holder 24 is moved in a direction opposite to the direction of the arrow J. That is, the ring holder 23 and the work holder 24 are moved toward each other to firmly clamp the roll-formed sheet ring 10 at both sides thereof. Moreover, the driving shaft 18 is moved in the direction of the arrow H to engage the tapered portion 3a of the centering member 3 with the bore 4a of the floating ring 4, thereby centering the floating ring 4 in coincidence with the axial center of the forming die 2, together with the formed sheet ring 10. Thereafter, the shaft 22 is rotated in the direction of the arrow F to rotate the formed sheet ring 10, while the cutting tool 27 is brought close to the forming die 2 and moved in the direction of the arrow I, thereby cutting the circular collars 10a of the formed sheet ring 10 (FIG. 11).

Figure 12:
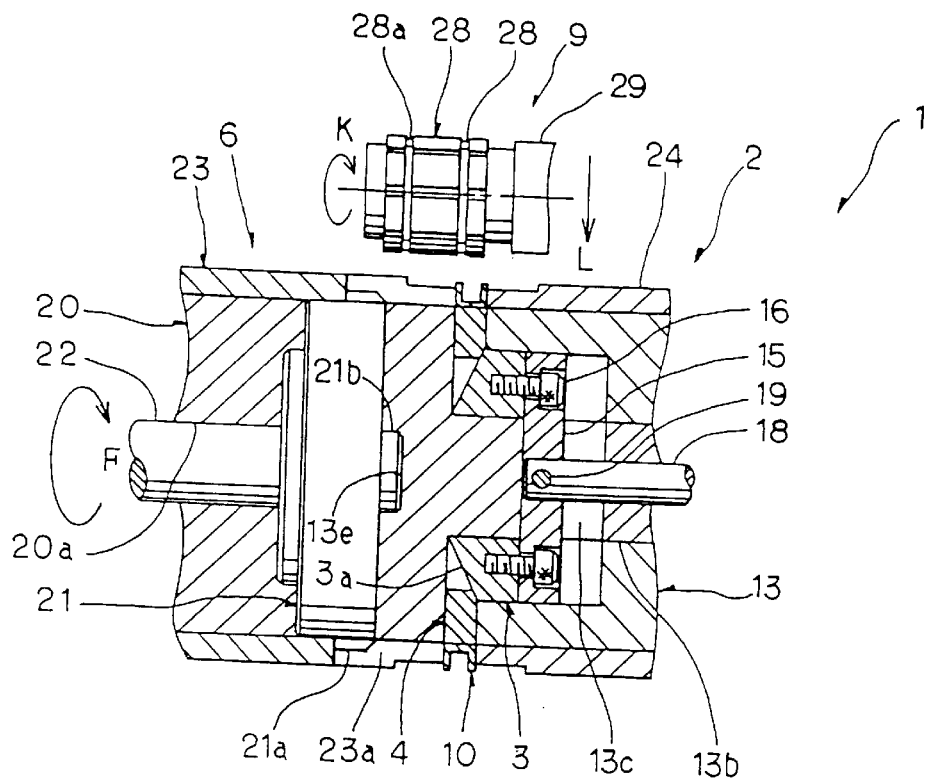
FIG. 12 is a vertical sectional view showing the way in which burrs are removed from the circular collars by a deburring device.
Figure 13:
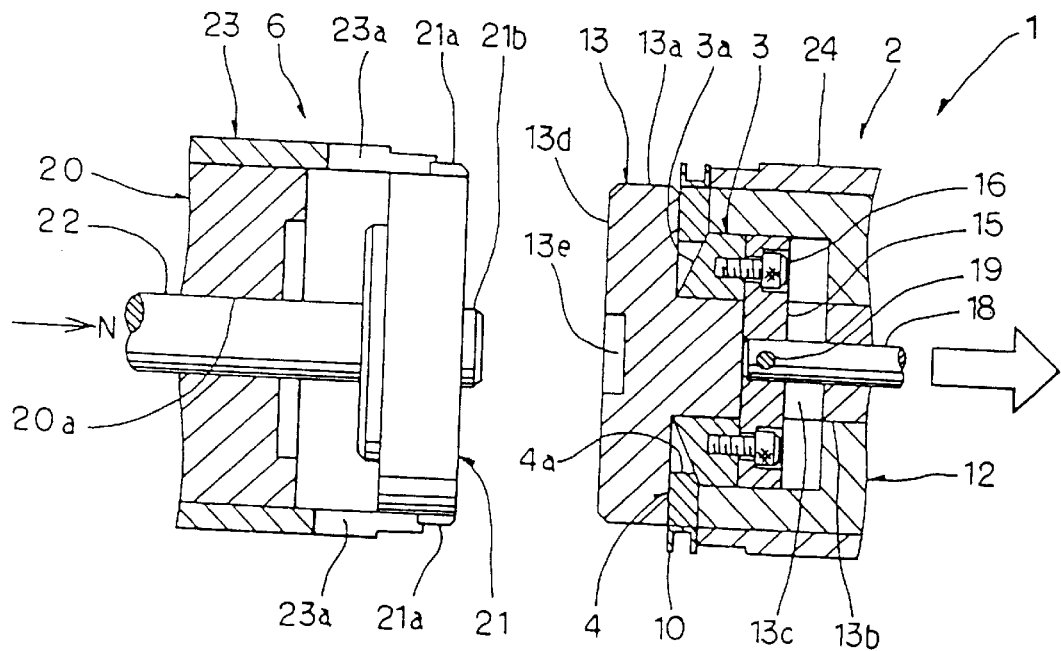
FIG. 13 is a vertical sectional view showing the way in which the forming die and the sheet ring retainer separate from each other upon completion of the working of the formed sheet ring.

Next, in FIG. 12, with the deburring roll 28 being rotated in the direction of the arrow K, the deburring device 9 is moved in the direction of the arrow L to insert the circular collars 10a into the groove-shaped cutting edges 28a, and the burrs 10b are removed from the end portions of the circular collars 10a by turning. Then, in FIG. 13, the forming die 2 is moved in the direction of the arrow M to separate from the sheet ring retainer 6. At this time, the ring retaining member 21 is projected in the direction of the arrow N by spring force to return to the previous position, while the completed formed sheet ring 10 is left on the forming die 2 in the state of being fitted on the floating ring 4.

Figure 14:
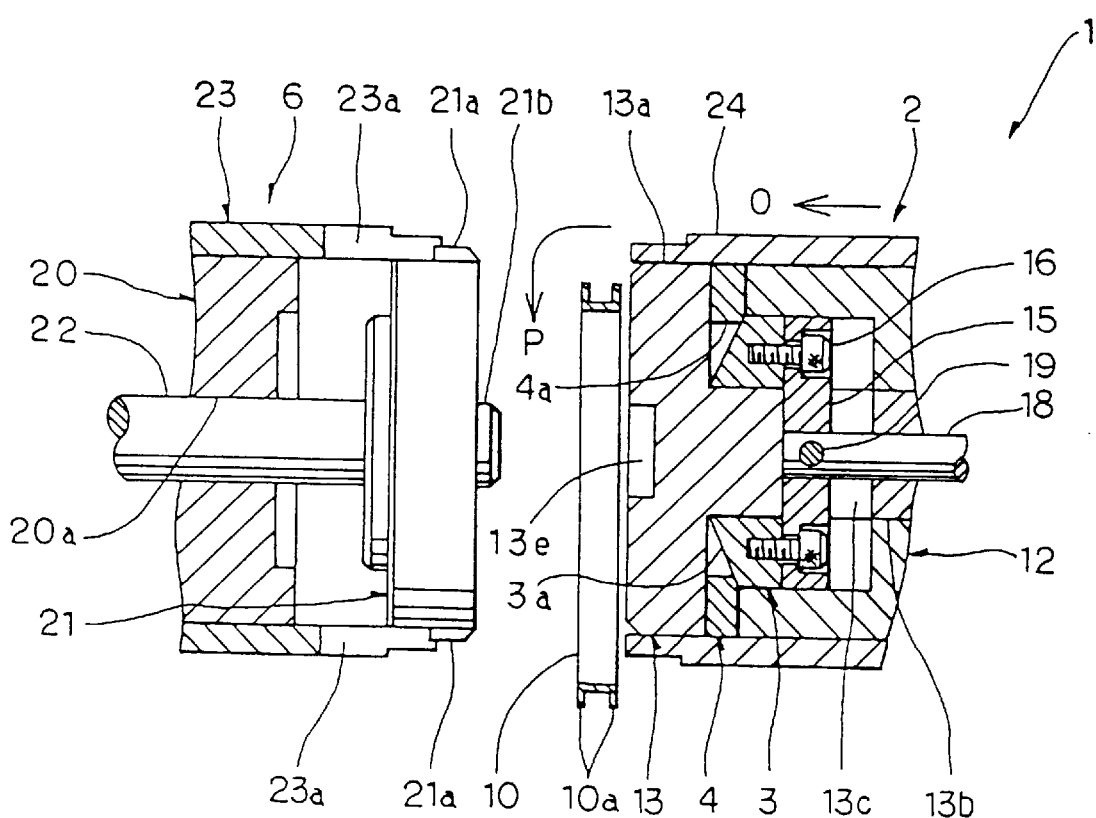
FIG. 14 is a vertical sectional view showing the way in which the completed formed sheet ring is pushed out of the forming die.
Figure 15:
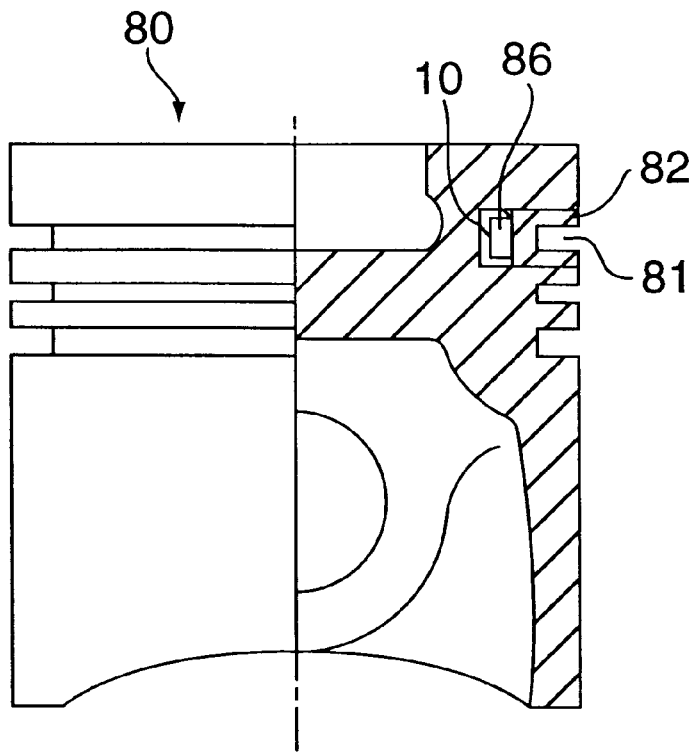
FIG. 15 is a partially sectional view showing a piston having a hollow ring groove insert inserted therein by casting.
Figure 16:
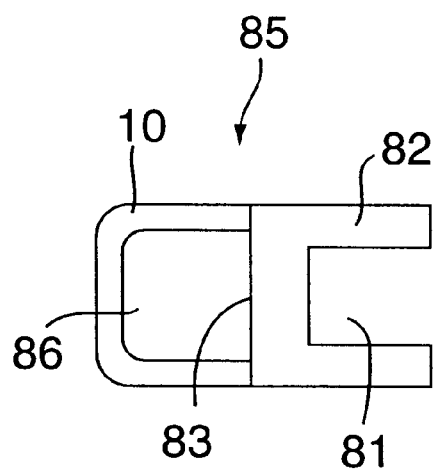
FIG. 16 is a sectional view of a hollow ring groove insert.

Next, in FIG. 14, the work holder 24 is moved in the direction of the arrow O to push the formed sheet ring 10 fitted on the floating ring 4 to fall in the direction of the arrow P. Thus, the production of the formed sheet ring 10 is completed. Thereafter, the above-described steps are successively repeated, thereby automatically and efficiently producing formed sheet rings 10.

ADVANTAGEOUS EFFECTS OF THE INVENTION

According to the present invention, a roll forming mechanism, a turning mechanism and a deburring mechanism for producing a formed sheet ring are incorporated into a single working apparatus, and thus a formed sheet ring constituting a hollow ring groove insert can be produced without removing a workpiece from a working apparatus and setting it on a subsequent working apparatus for each step. Therefore, formed sheet rings can be produced automatically, continuously and efficiently.

In the production apparatus according to the present invention, a roll forming mechanism, a turning mechanism, and a deburring mechanism are incorporated into a single working apparatus to realize a compact structure so that the apparatus can be installed in a narrow space. Therefore, it is possible to effectively utilize the space in a factory and to reduce the installation cost.

According to the present invention, a floating ring and a formed sheet ring can be highly accurately centered in coincidence with the axial center of a forming die simply by providing a tapered portion at one end of a centering member, and performing an operation in which the centering member is axially moved so that the tapered portion is engaged with the bore of the floating ring. Accordingly, centering and fixing of the floating ring can be efficiently effected within a short period of time with relative ease.

According to the present invention, a floating ring having an outer diameter equal to the inner diameter of a formed sheet ring is loosely fitted in a forming groove. During roll forming of a sheet ring, the floating ring is allowed to move in the radial direction, and the sheet ring is deformed while being in contact with the outer periphery of the floating ring, thereby roll-forming the sheet ring into a configuration having a U-shaped cross-section. Accordingly, the desired inner diameter of the formed sheet ring can be obtained with extremely high accuracy.

Furthermore, the floating ring and the formed sheet ring are centered and fixed in coincidence with the axial center of the forming die by moving the tapered portion of the centering member in the axial direction of the forming die to thereby engage the tapered portion with the bore of the floating ring. Therefore, the subsequent turning of the circular collars can be performed with high accuracy, and deburring can be performed subsequently to the turning process without transferring the formed sheet ring to another apparatus.

I claim:

1. A method of producing a hollow ring groove insert for an engine piston, which is disposed near a top of a piston for an engine to constitute a ring groove and a cooling path adjacent to the ring groove, said method including the steps of:

producing a formed sheet ring having a cylindrical part and a circular collar extending outward from each end of the cylindrical part; producing a ring body having an inner peripheral surface and a piston ring groove; combining together the formed sheet ring and the ring body such that an outer peripheral portion of each circular collar of the formed sheet ring engages with the inner peripheral surface of the ring body; and joining together the outer peripheral portion of the circular collar and the inner peripheral surface of the ring body;

said step of producing the formed sheet ring including the steps of:

producing a sheet ring;

preparing a production apparatus having a forming die with a circumferential forming groove; a floating ring disposed in the forming groove and capable of being selectively brought into a state where it is radially movable or a state where it is centered and fixed in coincidence with an axial center of the forming die, by engaging or disengaging a centering member having a taper with or from a bore of the floating ring; a forming roll having a predetermined width smaller than a width of the forming groove; a cutting tool; and a deburring tool;

fitting a sheet ring on the forming die such that the sheet ring covers the forming groove;

pressing the forming roll against the sheet ring radially inward while rotating the forming die with the floating ring placed in a movable state where it is radially movable, thereby forming circular collars on the sheet ring;

pressing the cutting tool against outer peripheral portions of the circular collars while rotating the forming die with the floating ring placed in a state where it is centered and fixed in coincidence with the axial center of the forming die, thereby turning the outer peripheral portions of the circular collars; and pressing the deburring tool against the outer peripheral portions of the circular collars while rotating the forming die with the floating ring being placed in the state where it is centered and fixed in coincidence with the axial center of the forming die, thereby removing burrs from the circular collars.

2. A production method according to claim 1, wherein the step of forming circular collars on the sheet ring, the step of turning the outer peripheral portions of the circular collars, and the step of removing burrs are carried out as a continuous process, and while these steps are carried out, the formed sheet ring is not removed from the production apparatus.

3. A production method according to claim 1, wherein the step of removing burrs comprises the step of inserting the outer peripheral portions of the circular collars into circumferential groove-shaped cutting edges, respectively, of a deburring roll constituting the deburring tool.

4. An apparatus for producing a formed sheet ring of a hollow ring groove insert for engine piston, said hollow ring groove insert comprising a formed sheet ring having a cylindrical part and a circular collar extending outward from each end of the cylindrical part, and a ring body having an inner peripheral surface and a piston ring groove, wherein an outer peripheral portion of each circular collar of the formed sheet ring is joined to the inner peripheral surface of the ring body, said hollow ring groove insert being disposed near a top of a piston for an engine to constitute a ring groove and a cooling path adjacent to the ring groove, said apparatus comprising:

a forming die having a circumferential forming groove;

a centering member having a tapered portion formed at one end thereof, said centering member being axially slidable;

a floating ring disposed in the forming groove, said floating ring having an outer diameter equal to an inner diameter of the formed sheet ring, said floating ring being selectively engaged with or disengaged from the tapered portion of the centering member thereby being brought into a state where it is centered and fixed in coincidence with an axial center of the forming die or a state where it is radially movable within the forming groove;

a sheet ring retainer for positioning a sheet ring on the forming die such that the sheet ring covers the forming groove, and for clamping the sheet ring in cooperation with a work holder disposed on an outer peripheral portion of the forming die;

a forming roll having a predetermined width smaller than a width of the forming groove, said forming roll being arranged to press the sheet ring radially inward into the forming groove, thereby forming circular collars on the sheet ring;

a cutting tool for cutting outer peripheral portions of the circular collars being rotated; and a deburring tool brought into contact with the circular collars being rotated to remove burrs from the circular collars, which were formed by cutting;

wherein, while the forming roll is forming the circular collars on the sheet ring, the floating ring is radially movable within the forming groove, and while the cutting tool is cutting the outer peripheral portions of the circular collars of the formed sheet ring and while the deburring tool is removing the burrs, the floating ring is fixed in the centered state.

5. A production apparatus according to claim 4, wherein the predetermined width of said forming roll is smaller than the width of the forming groove by approximately double a sheet thickness of the formed sheet ring, and said deburring tool has circumferential groove-shaped cutting edges with a width approximately equal to the sheet thickness of the formed sheet ring, so that the outer peripheral portions of the circular collars are inserted into the groove-shaped cutting edges, respectively, of the deburring tool, and thus the burrs are removed from the circular collars.

6. A production apparatus according to claim 4, wherein the forming die has a cylindrical body coaxial with the centering member, a collared shaft with a collar, and a work holder slidably fitted on an outer peripheral surface of the body, the forming groove being formed between the body and the collar; and the sheet ring retainer has a shaft slidably fitted to a support, a ring retaining member secured to the shaft to axially face the forming die and having a plurality of radial projections on an outer peripheral surface thereof, and a ring holder slidably fitted on an outer peripheral surface of the support and having relief grooves formed so as to correspond to the projections, respectively, the plurality of radial projections having an outer diameter equal to the inner diameter of the sheet ring; and wherein, in a state where the sheet ring retaining member and the ring holder are axially separate from the forming die, the sheet ring is fed from a feed mechanism and fitted onto the outer peripheral surface of the ring retaining member, and thereafter, the sheet ring retaining member and the forming die are axially moved and engaged with each other, thereby enabling the sheet ring to be positioned over the forming groove, being clamped between the ring holder and the work holder.

\* \* \* \* \*